US009829188B2

(12) United States Patent
Lee et al.

(10) Patent No.: US 9,829,188 B2
(45) Date of Patent: Nov. 28, 2017

(54) LIGHT-EMITTING DIODE DRIVING APPARATUS AND LIGHTING DEVICE

(71) Applicant: SAMSUNG ELECTRONICS CO., LTD., Suwon-si (KR)

(72) Inventors: Bong-jin Lee, Hwaseong-si (KR); Kyu-cheol Kang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/345,676

(22) Filed: Nov. 8, 2016

(65) Prior Publication Data

US 2017/0268763 A1    Sep. 21, 2017

(30) Foreign Application Priority Data

Mar. 16, 2016    (KR) .................. 10-2016-0031460

(51) Int. Cl.
*H01L 31/12* (2006.01)
*F21V 29/54* (2015.01)
*H05B 33/08* (2006.01)

(52) U.S. Cl.
CPC .......... *F21V 29/54* (2015.01); *H05B 33/0815* (2013.01)

(58) Field of Classification Search
CPC ............... H01L 29/7395; H01L 29/749; H01L 29/1095; H01L 27/3244; H01L 25/167; H01L 27/15
See application file for complete search history.

(56) References Cited

U.S. PATENT DOCUMENTS

| | | |
|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |

(Continued)

FOREIGN PATENT DOCUMENTS

| | | |
|---|---|---|
| JP | 2002-78367 A | 3/2002 |
| JP | 2004-296989 A | 10/2004 |

(Continued)

*Primary Examiner* — Minh D A
(74) *Attorney, Agent, or Firm* — Sughrue Mion, PLLC

(57) ABSTRACT

An LED driving apparatus includes: a PCB substrate having a voltage transformer and a switching device provided above the PCB substrate, the PCB substrate including a first circuit corresponding to a primary side of the voltage transformer and a second circuit corresponding to a secondary side of the voltage transformer; a first molding layer which is provided on the PCB substrate and covers the voltage transformer and the switching device; and a plurality of thermoelectric devices where heat dissipates. Some of the thermoelectric devices are connected to the first circuit and others of the thermoelectric devices are connected to the second circuit.

20 Claims, 11 Drawing Sheets

(56) References Cited

U.S. PATENT DOCUMENTS

| | | |
|---|---|---|
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 * | 9/2013 | Kwak .................. H01L 33/508 257/79 |
| 8,735,931 B2 | 5/2014 | Han et al. |
| 8,766,295 B2 | 7/2014 | Kim |
| 9,013,119 B2 | 4/2015 | Simon et al. |
| 2011/0235328 A1 | 9/2011 | Xu et al. |
| 2014/0110671 A1 | 4/2014 | Kim |

FOREIGN PATENT DOCUMENTS

| | | |
|---|---|---|
| JP | 2009-99406 A | 5/2009 |
| JP | 2011-44413 A | 3/2011 |
| KR | 10-0671851 B1 | 1/2007 |
| KR | 10-1151774 B1 | 6/2012 |
| KR | 10-2014-0073704 A | 6/2014 |
| KR | 10-1448654 B1 | 10/2014 |
| KR | 10-2015-0055443 A | 5/2015 |

\* cited by examiner

LIGHT-EMITTING DIODE DRIVING APPARATUS AND LIGHTING DEVICE

CROSS-REFERENCE TO RELATED APPLICATION

This application claims priority from Korean Patent Application No. 10-2016-0031460, filed on Mar. 16, 2016 in the Korean Intellectual Property Office, the disclosure of which is incorporated by reference herein in its entirety.

BACKGROUND

Apparatuses consistent with exemplary embodiments relate to a light-emitting diode (LED) driving apparatus and a lighting device, and more particular, to an LED driving apparatus having high efficiency and a lighting device having high efficiency.

The demand for lighting has been increasing and various fields require lighting. Accordingly, the power consumption is increasing and, thus, various efforts have been made to reduce power consumption.

An LED includes a semiconductor that emits light when a current is provided under certain conditions. LED light sources have a longer lifespan, higher efficiency, a smaller size, and a less weight than light sources of the related art. In addition, LED light sources are environmentally friendly due to the absence of mercury (Hg) therein. Due to these features, LED light sources are rapidly replacing light sources of the related art.

SUMMARY

Exemplary embodiments provide an LED driving apparatus and a lighting device, each having high efficiency due to the supply of electric energy obtained by converting heat energy.

According to an aspect of an exemplary embodiment, there is provided an LED driving apparatus including: a printed circuit board (PCB) substrate having a voltage transformer and a switching device, which are provided above the PCB substrate, the PCB substrate including a first circuit corresponding to a primary side of the voltage transformer and a second circuit corresponding to a secondary side of the voltage transformer; a first molding layer provided on the PCB substrate and covering the voltage transformer and the switching device; at least one first thermoelectric device which dissipates heat and is connected to the first circuit; and at least one second thermoelectric device which dissipates heat and is connected to the second circuit.

According to an aspect of another exemplary embodiment, there is provided a lighting device including: a first circuit including at least one first thermoelectric device and a switching device configured to switch electric power supplied to a light-emitting diode; a second circuit including at least one second thermoelectric device, and connected to the LED to drive the light-emitting diode; and a voltage transformer configured to control a voltage of the first circuit and the second circuit, wherein the at least one first thermoelectric device is connected to a first ground of the first circuit, and the at least one second thermoelectric device is connected to a second ground of the second circuit.

According to an aspect of another exemplary embodiment, there is provided an LED driving apparatus including: a printed circuit board (PCB) substrate; a voltage transformer which is provided on an upper surface of the PCB substrate, the voltage transformer having a primary side connected to an input power supply and a secondary side connected to a light emitting device (LED); a first circuit provided on the upper surface of the PCB substrate, the first circuit including a switching device connected between the primary side of the voltage transformer and a first ground terminal; a second circuit disposed on the upper surface of the PCB substrate and connected between the secondary side of the voltage transformer and the LED; a first thermoelectric device connected between the switching device and the first ground terminal, the first thermoelectric device being configured to generate electric power and supply the generated electric power to the switching device; and a second thermoelectric device connected to a second ground terminal and the LED, the second thermoelectric device being configured to generate the electric power and supply the generated electric power to the LED, wherein at least a portion of the first thermoelectric device or a portion of the second thermoelectric device is disposed proximate the voltage transformer and overlaps the voltage transformer, to receive heat generated by the voltage transformer.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Figure 1A:
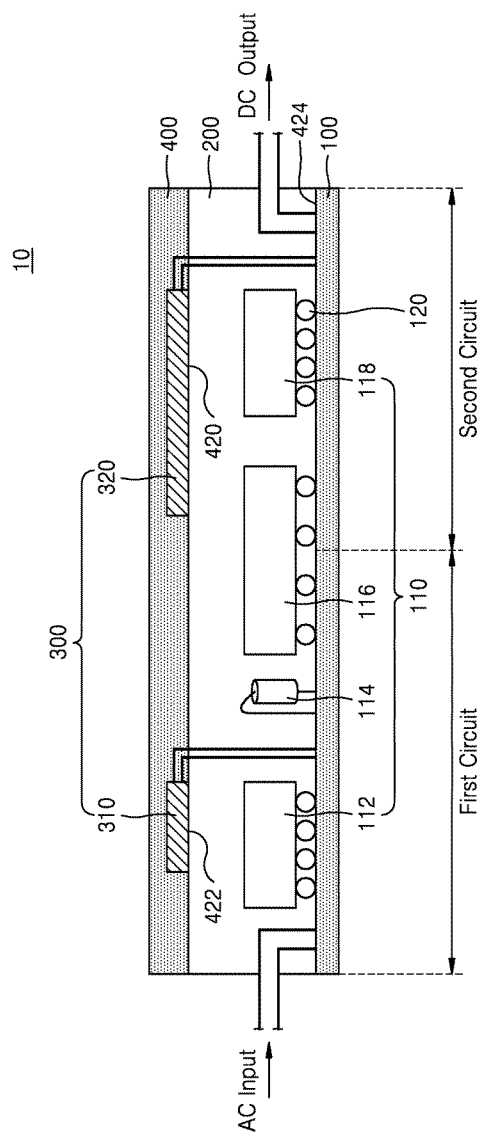
FIG. 1A is a side sectional view of an LED driving apparatus according to an exemplary embodiment.
Figure 1B:
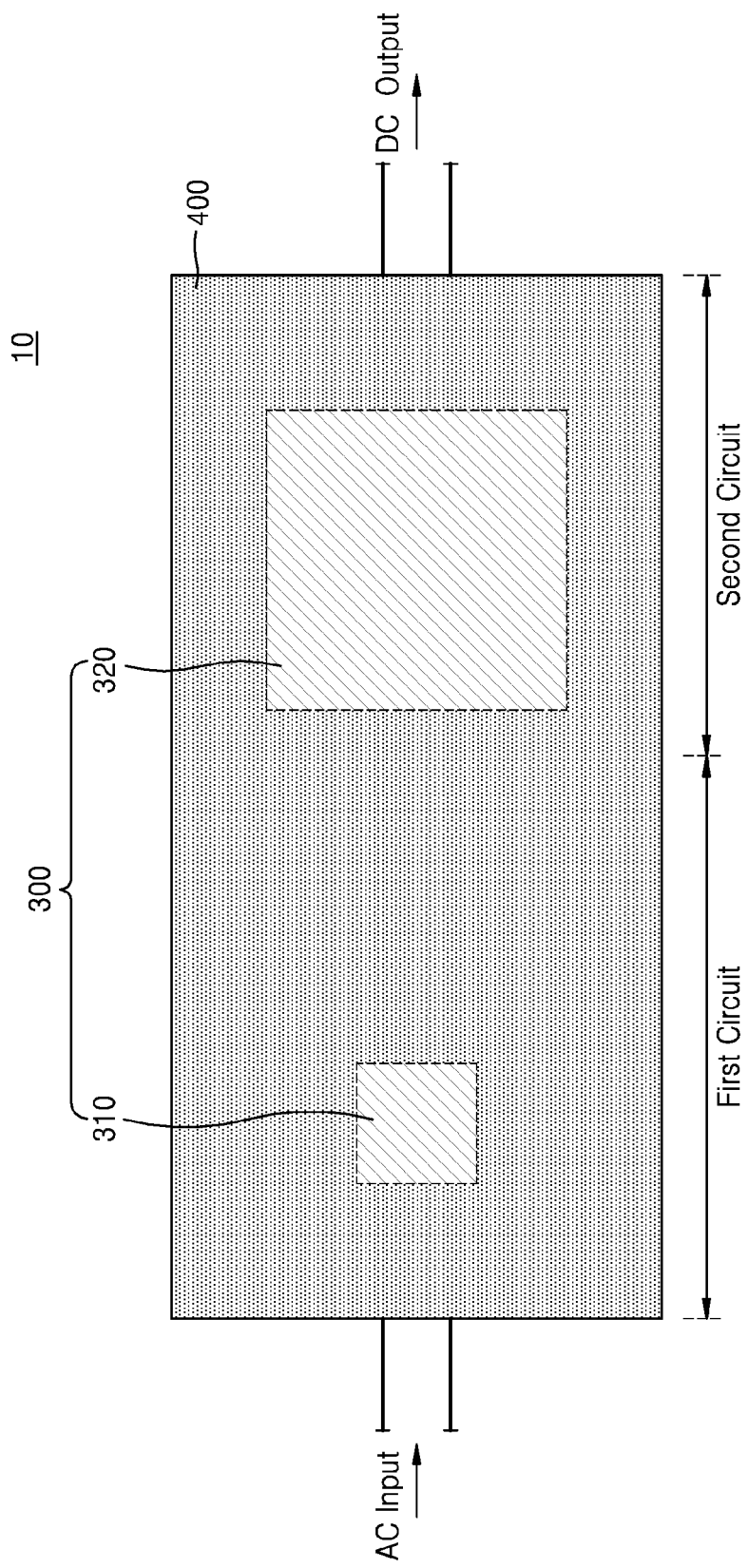
FIG. 1B is a plan view of an LED driving apparatus according to an exemplary embodiment.

FIG. 1A is a side sectional view of an LED driving apparatus 10 according to an exemplary embodiment. FIG. 1B is a plan view of the LED driving apparatus 10 of FIG. 1A.

Referring to FIG. 1A, the LED driving apparatus 10 according to the present exemplary embodiment may include a printed circuit board (PCB) substrate 100 above which one or more circuit devices 110 are mounted, and a first molding layer 200 and a plurality of thermoelectric devices 300 disposed on or above the PCB substrate 100.

The circuit device 110 provides appropriate power to an LED, and is mounted in a flip-chip bonding manner or a wire bonding manner on the PCB substrate 100. In FIG. 1A, the circuit device 110 is mounted above the PCB substrate 100 via a bump or bumps 120. The circuit device 110 may include, for example, a switching device 112, an inductor 114, a voltage transformer 116, a rectifier 118, etc. Elements constituting the circuit device 110 may be electrically connected to one another via a circuit pattern formed in the PCB substrate 100. The structure and shape of the circuit device 110 are not limited to the exemplary embodiment illustrated in FIG. 1A, and are only an example.

The PCB substrate 100 may include, for example, FR-4 or CEM-3 composite material, but a material therefor is not limited thereto. The circuit pattern may include a conductive material, for example, metal, such as copper (Cu), aluminum (Al), gold (Au), or silver (Ag). Through the circuit pattern, the LED driving apparatus 10 may rectify AC power, and/or may function as a DC/DC converter that changes DC amplitude.

The circuit pattern of the PCB substrate 100 may be divided into two or more circuits, for example, into a first circuit 510 and a second circuit 520 (refer to FIG. 5) which may be connected to a first ground and a second ground, respectively. For example, with respect to the voltage transformer 116, the circuit pattern of the PCB substrate 100 may be divided into a primary side circuit (e.g., corresponding to a first circuit), and a secondary side circuit (e.g., corresponding to a second circuit). The primary side circuit and the secondary side circuit may be connected to a first ground and a second ground, respectively. When the LED driving apparatus 10 includes an auxiliary power source, the auxiliary power source may be connected to a third ground. That is, the number of grounds is not limited, and may vary depending on the circuit configuration.

Referring to FIG. 1A, the switching device 112 and the inductor 114 may be electrically connected to the primary side circuit, and the rectifier 118 may be electrically connected to the secondary side circuit. However, the circuit configuration is not limited thereto. For example, the switching device 112 may be connected to the secondary side circuit, and the rectifier 118 may be connected to the primary side circuit.

The thermoelectric devices 300 generate regenerative energy by using the Seebeck effect, which is a phenomenon in which an external temperature difference leads to electric energy. Accordingly, the thermoelectric devices 300 may supply power to other devices connected to the thermoelectric devices 300. The thermoelectric devices 300 may be disposed between a high-temperature element and a low-temperature element. The high-temperature element refers to an element having a temperature being higher than that of the low-temperature element. The high-temperature element and the low-temperature element may be some of elements constituting the LED driving apparatus 10 including the thermoelectric devices 300. For example, the high-temperature element may be a voltage transformer that generates heat.

The thermoelectric devices 300 include thermoelectric devices 310 connected to the primary side circuit, and thermoelectric devices 320 connected to the secondary side circuit. Accordingly, when there is a plurality of grounds, a particular ground may be selected and the thermoelectric devices 300 may be connected thereto. That is, regardless of a potential difference between grounds, power generated by the thermoelectric devices 300 may be selectively provided to the circuit device 110 mounted over the PCB substrate 100.

The first molding layer 200 may cover the circuit device 110 and the bump 120 to protect the circuit device 110 and the bump 120 from external chemical and physical impacts. The first molding layer 200 may include a synthetic resin, such as an epoxy resin, a hardening agent, an organic/inorganic filler, etc. and may be formed by extrusion-molding inside a mold. The first molding layer 200 may include a polymer, such as a resin. For example, the first molding layer 200 may include an epoxy molding compound (EMC).

The material and method of forming the first molding layer 200 are not limited thereto. The first molding layer 200 may be formed by a molded underfill (MUF) process. In the MUF process, without an underfill process for a space between the circuit device 110 and the PCB substrate 100, the first molding layer 200 is used to fill the space between the circuit device 110 and the PCB substrate 100. When the first molding layer 200 is formed by a MUF process, a material for a molding element covering the circuit device 110 may be identical to a material for a molding element filling the space between the circuit device 110 and the PCB substrate 100.

In one or more exemplary embodiments, however, the first molding layer 200 may be formed without an MUF process. That is, the space between the circuit device 110 and the PCB substrate 100 is filled by underfill, and then, the circuit device 110 is externally covered by an external molding member. In this case, a material for the underfill filling the space between the circuit device 110 and the PCB substrate 100 may be identical to a material for the external molding member externally covering the circuit device 110. However, in one or more exemplary embodiments, the material for the underfill may be different from the material for the external molding member.

The thermoelectric devices 300 may be provided on the first molding layer 200. In this case, to protect the thermoelectric devices 300 from external chemical and physical impacts, the second molding layer 400 may be provided on the thermoelectric devices 300. The material and method of forming the second molding layer 400 may be similar to those for forming the first molding layer 200. However, exemplary embodiments are not limited thereto. In one or more exemplary embodiments, the thermoelectric devices 300 may be attached on the circuit device 110, as described below in connection with FIG. 3.

Referring to FIG. 1A, each of the thermoelectric devices 300 has a surface 420, 422 parallel to an upper surface 424 of the PCB substrate 100, and an area of the surface 420, 422 is proportional to power consumed by a circuit connected to the thermoelectric devices 300. When the thermoelectric devices 300 occupy more area between the high-temperature element and the low-temperature element, the thermoelectric devices 300 produce more power. Accordingly, to provide more power to a circuit side that consumes more, thermoelectric devices having a relatively wide area may be connected to the circuit side.

Referring to FIG. 1B, assuming that the secondary side circuit consumes more power than the primary side circuit, the thermoelectric devices 320 connected to the secondary side circuit occupy a wider area than the thermoelectric devices 310 connected to the primary side circuit. However, exemplary embodiments are not limited thereto. In one or more exemplary embodiments, the areas of the thermoelectric devices 300 may be set in a manner different from what has been described above.

Figure 2A:
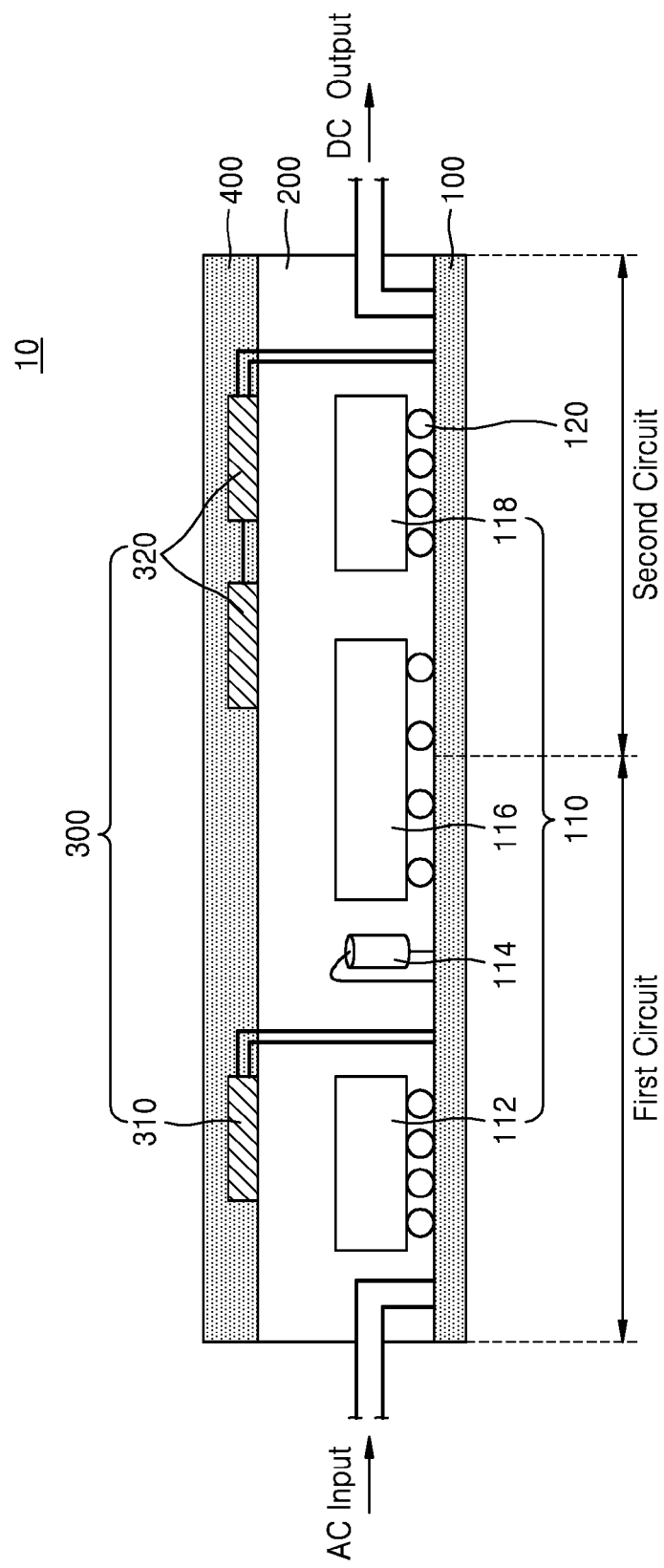
FIG. 2A is a side sectional view of an LED driving apparatus according to an exemplary embodiment.
Figure 2B:
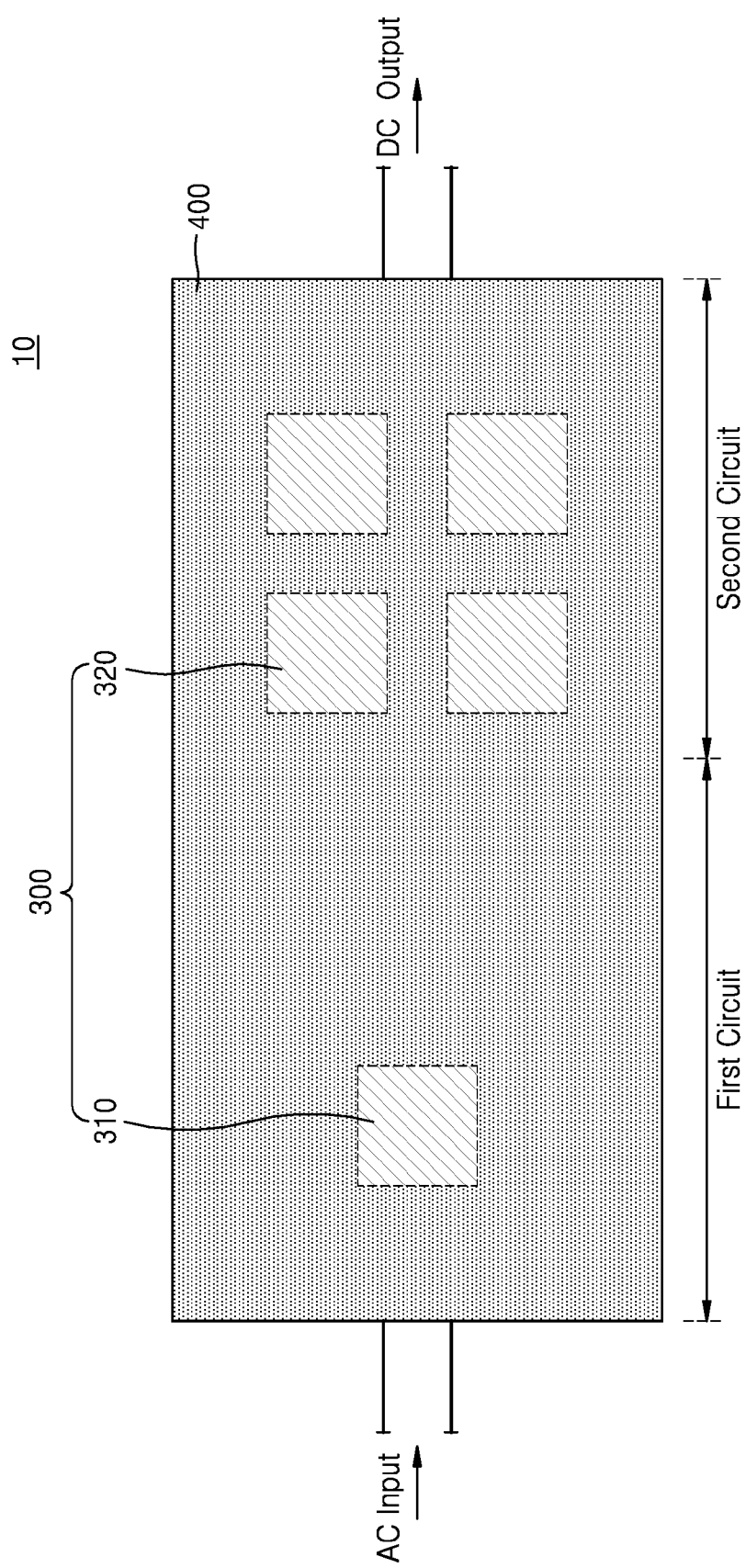
FIG. 2B is a plan view of an LED driving apparatus according to an exemplary embodiment.

FIG. 2A is a side sectional view of an LED driving apparatus 10 according to an exemplary embodiment. FIG. 2B is a plan view of the LED driving apparatus 10 of FIG. 2A.

Referring to FIGS. 2A and 2B, the LED driving apparatus 10 according to the present exemplary embodiment may include the PCB substrate 100 above which the circuit device 110 is mounted, and the first molding layer 200 and a plurality of thermoelectric devices 300 on or above the PCB substrate 100. With respect to the voltage transformer 116, the PCB substrate 100 is divided into the primary side circuit and the secondary side circuit. The thermoelectric devices 300 may include the thermoelectric devices 310 connected to the primary side circuit and thermoelectric devices 320 connected to the secondary side circuit.

In this regard, in a proportion to power consumed by a circuit connected to the thermoelectric devices 300, the number of thermoelectric devices connected in series may increase. When the thermoelectric devices 300 are connected in series, power generated by each of the thermoelectric devices 300 is added up to produce greater power. Accordingly, a relatively greater number of thermoelectric devices may be connected to a circuit that consumes more power. Referring to FIG. 2B, assuming that the secondary side circuit consumes more power than the primary side circuit, the number of thermoelectric devices 320 connected in series to the secondary side circuit may be greater than the number of thermoelectric devices 310 connected in series to the primary side circuit. However, exemplary embodiments are not limited thereto. In one or more exemplary embodiments, the number of thermoelectric devices 300 connected in series may vary.

Figure 3:
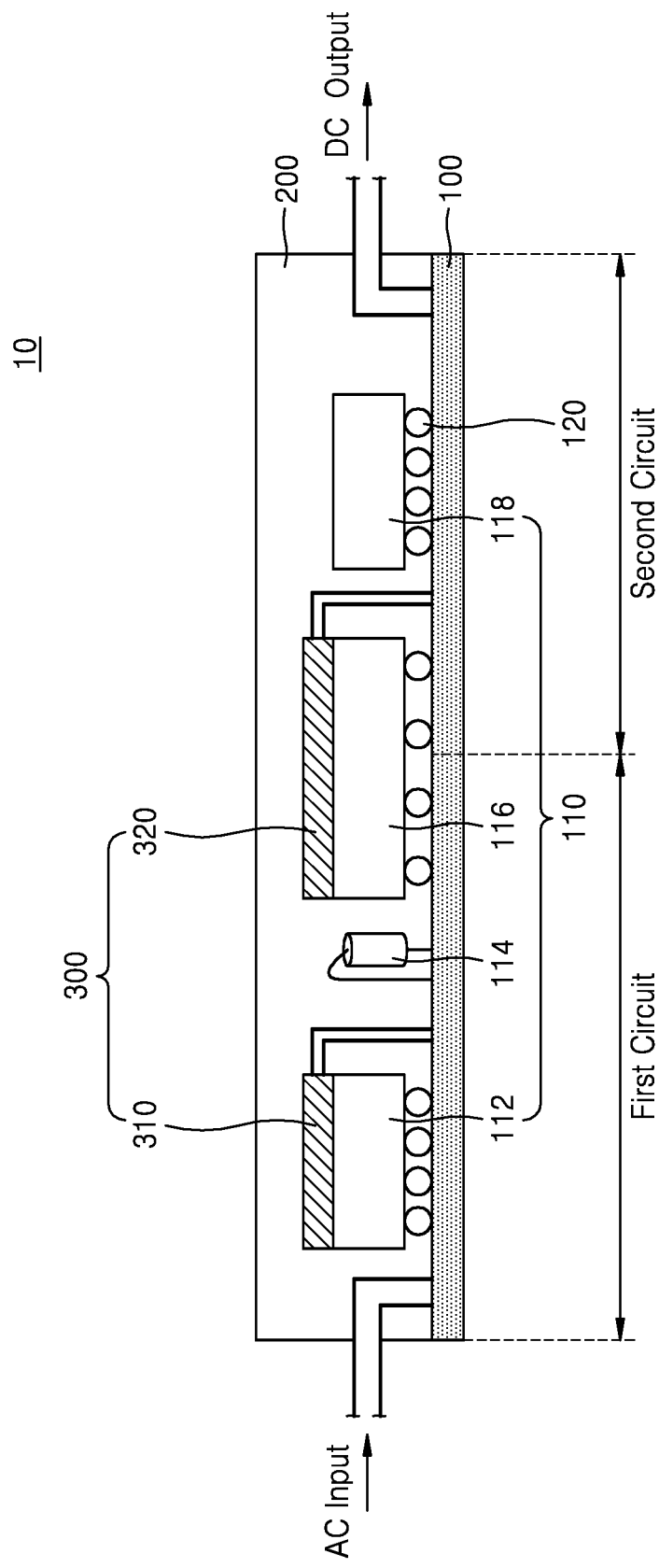
FIG. 3 is a side sectional view of an LED driving apparatus according to an exemplary embodiment.

FIG. 3 is a side sectional view of an LED driving apparatus 10 according to an exemplary embodiment.

Referring to FIG. 3, the LED driving apparatus 10 according to the present exemplary embodiment may include the PCB substrate 100 above which the voltage transformer 116 and the switching device 112 are mounted, and the first molding layer 200 and a plurality of thermoelectric devices 300 on or above the PCB substrate 100. With respect to the voltage transformer 116, the PCB substrate 100 is divided into the primary side circuit and the secondary side circuit. The thermoelectric devices 300 may include thermoelectric devices 310 connected to the primary side circuit and thermoelectric devices 320 connected to the secondary side circuit.

The thermoelectric devices 300 may be attached on the voltage transformer 116. In one or more exemplary embodiments, the thermoelectric devices 300 may be attached on the switching device 112. Referring to FIG. 3, the thermoelectric devices 310 connected to the primary side circuit are attached on the switching device 112, and the thermoelectric devices 320 connected to the secondary side circuit are attached on the voltage transformer 116. However, the exemplary embodiment illustrated in FIG. 3 is not limited thereto and can be modified according to the circuit configuration. For example, the voltage transformer 116 may be heated to a temperature of about 70 to about 85 r, and the switching device 112 may be heated to a temperature of about 50 to about 70° C. Accordingly, when the thermoelectric device 300 is attached, power may be efficiently generated.

Figure 4:
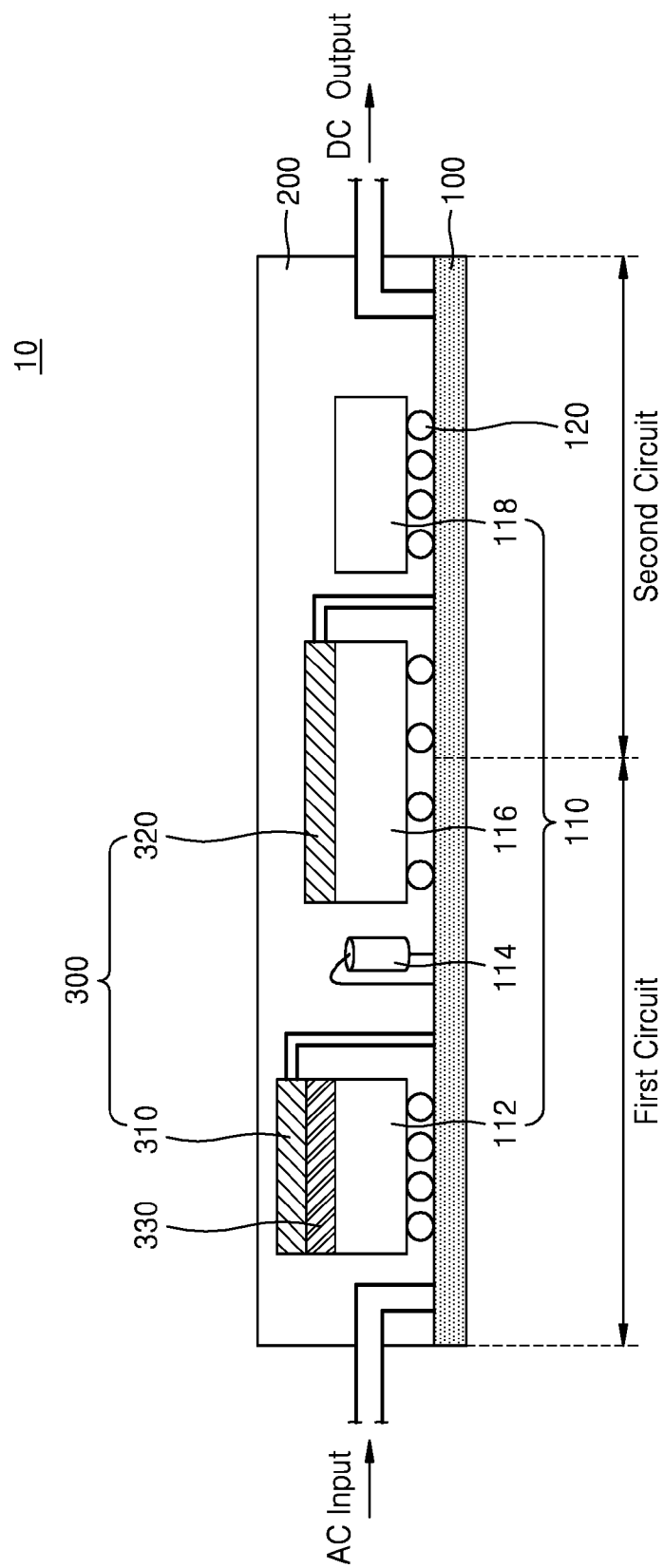
FIG. 4 is a side sectional view of an LED driving apparatus according to an exemplary embodiment.

FIG. 4 is a side sectional view of an LED driving apparatus 10 according to an exemplary embodiment.

Referring to FIG. 4, the LED driving apparatus 10 according to the present exemplary embodiment may include the PCB substrate 100 above which the voltage transformer 116 and the switching device 112 are mounted, and the first molding layer 200 and a plurality of thermoelectric devices 300 on or above the PCB substrate 100. With respect to the voltage transformer 116, the PCB substrate 100 is divided into the primary side circuit and the secondary side circuit. The thermoelectric devices 300 may include thermoelectric devices 310 connected to the primary side circuit and thermoelectric devices 320 connected to the secondary side circuit.

The thermoelectric devices 300 may be attached on the voltage transformer 116 or the switching device 112. In this regard, a heat dissipating plate 330 may be disposed between the switching device 112 and the thermoelectric devices 300. Referring to FIG. 4, the thermoelectric devices 310 connected to the primary side circuit are attached on the switching device 112 with the heat dissipating plate 330 therebetween. However, the configuration of the thermoelectric devices 310 is not limited thereto. In one or more exemplary embodiments, when the switching device 112 is connected to the secondary side circuit, the thermoelectric devices 320 connected to the secondary side circuit may be attached on the switching device 112. That is, the exemplary embodiments may be modified depending on a circuit configuration. In one or more exemplary embodiments, a heat dissipating plate may be disposed between the voltage transformer 116 and the thermoelectric devices 300.

The heat dissipating plate 330 may have a certain thickness and a certain level of rigidity, and may have a flat panel shape. For example, the heat dissipating plate 330 may include a material selected from copper, copper alloy, aluminum, aluminum alloy, steel, stainless steel, and a combination thereof, which are highly heat conductive materials.

Figure 5:
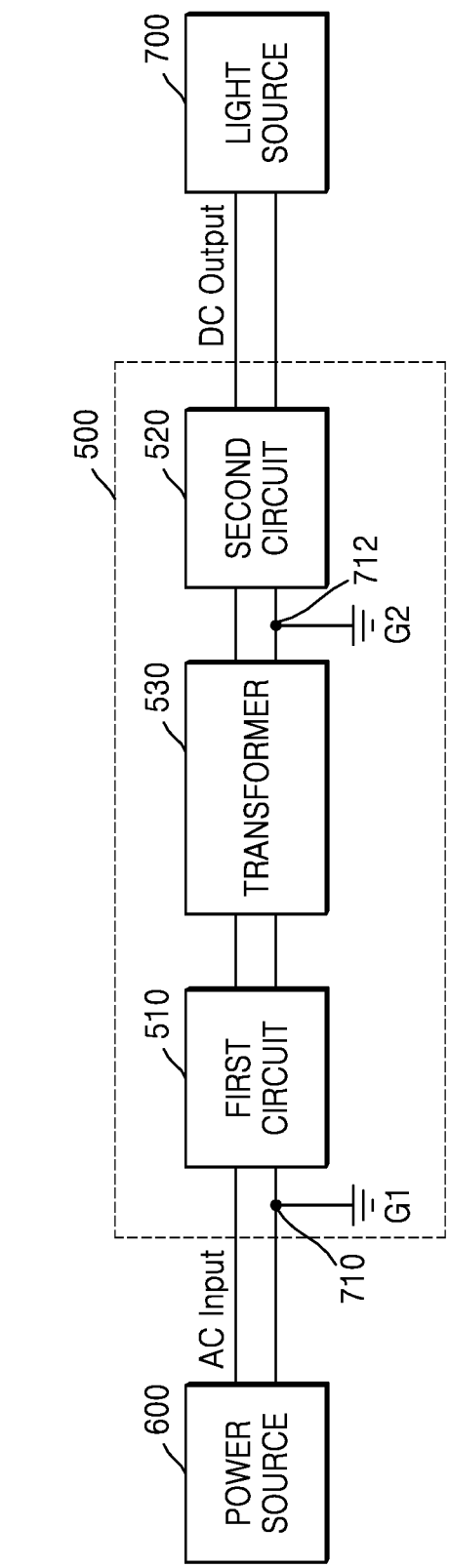
FIG. 5 shows a block diagram of a lighting device according to an exemplary embodiment.

FIG. 5 shows a block diagram of a lighting device 50 according to an exemplary embodiment.

Referring to FIG. 5, the lighting device 50 according to the present exemplary embodiment may include a power source 600, an LED driving apparatus 500, and a light source 700. The LED driving apparatus 500 may include a first circuit 510, a second circuit 520, and a voltage transformer 530, and may correspond to the driving apparatus 10 described above. The LED driving apparatus 500 may rectify input AC power, and may function as a DC/DC converter which changes DC voltage amplitude.

The first circuit 510 may be connected to a first ground G1 and the second circuit 520 may be connected to a second ground G2. The voltage transformer 530 may control the voltage of the first circuit 510 or the second circuit 520. There may be a potential difference between the first ground G1 and the second ground G2. When the LED driving apparatus 500 further includes an auxiliary power source, the auxiliary power source may be connected to a third ground. There may be a potential difference among the first through third grounds.

The LED driving apparatus 500 may drive one or more LEDs included in the light source 700 by using an input voltage generated by the power source 600. The LED driving apparatus 500 may receive an AC power input from the power source 600 and may apply a DC output to the light source 700. Accordingly, the LED driving apparatus 500 may have a driving circuit that generates an LED current to drive an LED, and the driving circuit may include a DC/DC converter circuit. In one or more exemplary embodiments, the driving circuit may be embodied in various topologies including a fly-back converter, a forward converter, a halfbridge inverter, a full-bridge inverter, a single-stage converter, etc. The circuit configuration may vary depending on a converter.

Figure 6:
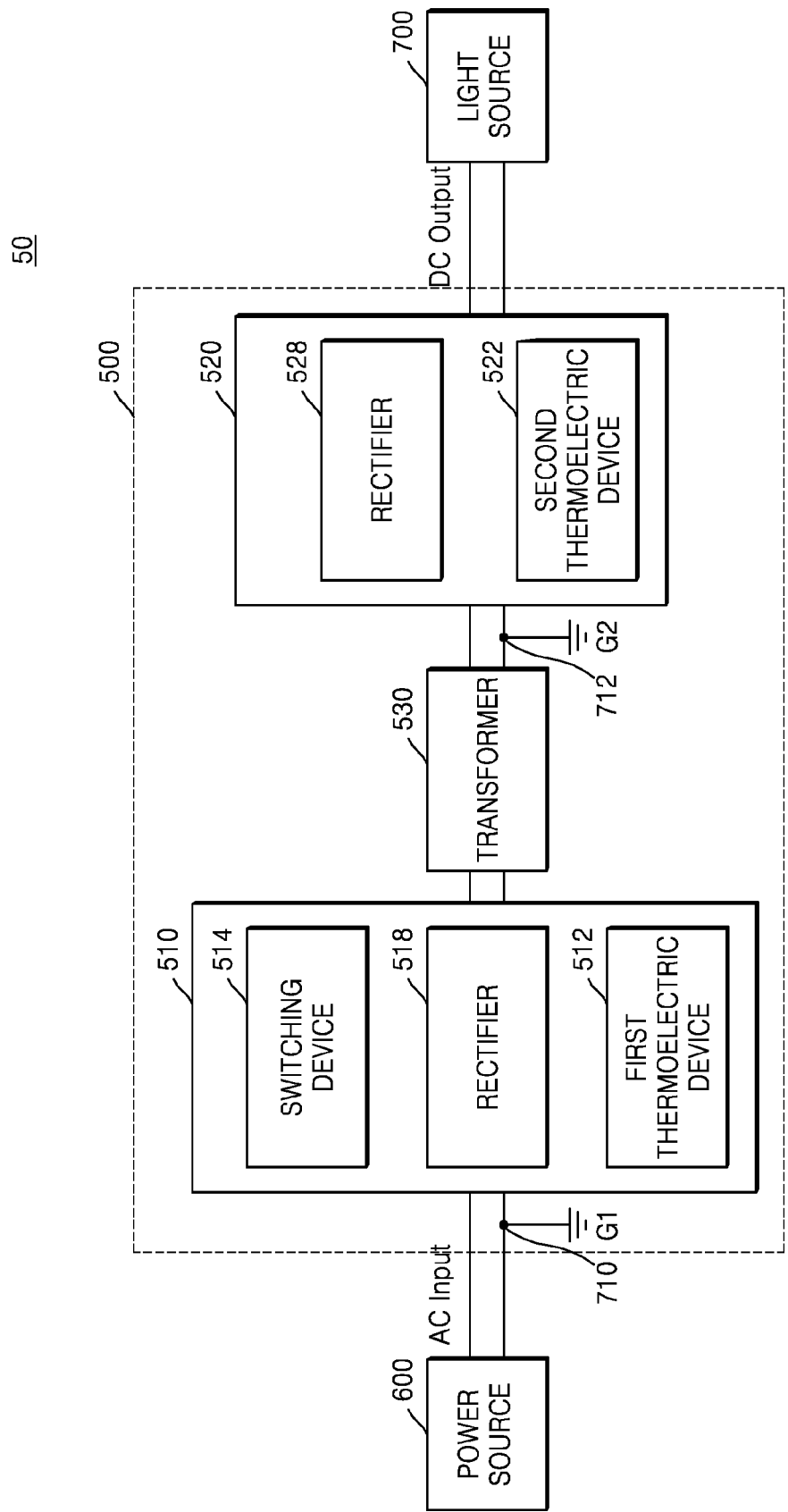
FIG. 6 shows a block diagram of a lighting device according to an exemplary embodiment.

FIG. 6 shows a block diagram of a lighting device 50 according to an exemplary embodiment.

Referring to FIG. 6, the lighting device 50 according to the present exemplary embodiment may include the power source 600, the LED driving apparatus 500, and the light source 700. The LED driving apparatus 500 may include the first circuit 510, the second circuit 520, and the voltage transformer 530. Herein, the present exemplary embodiment will be described based on only the difference distinguishable from the exemplary embodiment described in connection with FIG. 5.

The first circuit 510 may include one or more switching devices 514 and one or more first thermoelectric devices 512. The switching device 514 may switch power supplied to the light source 700 including an LED. The at least one first thermoelectric device 512 is a device that generates power by using the Seebeck effect. The at least one first thermoelectric device 512 may be between a high-temperature element and a low-temperature element, and the high-temperature element and the low-temperature element may be some of elements constituting the LED driving apparatus 500. The at least one first thermoelectric device 512 may be connected to the first ground G1 via a first ground terminal 710.

The second circuit 520 may include one or more second thermoelectric devices 522. The second circuit 520 may be connected to the LED and may directly drive the LED. The at least one second thermoelectric device 522 may be connected to the second ground G2 via a second ground terminal 712. For example, the first ground terminal 710 and the second ground terminal 712 have a difference in potential. Explanation of the at least one second thermoelectric device 522 may be the same as made in connection with the at least one first thermoelectric device 512.

The first circuit 510 and the second circuit 520 may further include one or more rectifiers 518 and one or more rectifiers 528, respectively. The rectifiers 518 and 528 may rectify an AC voltage into a DC voltage.

Figure 7:
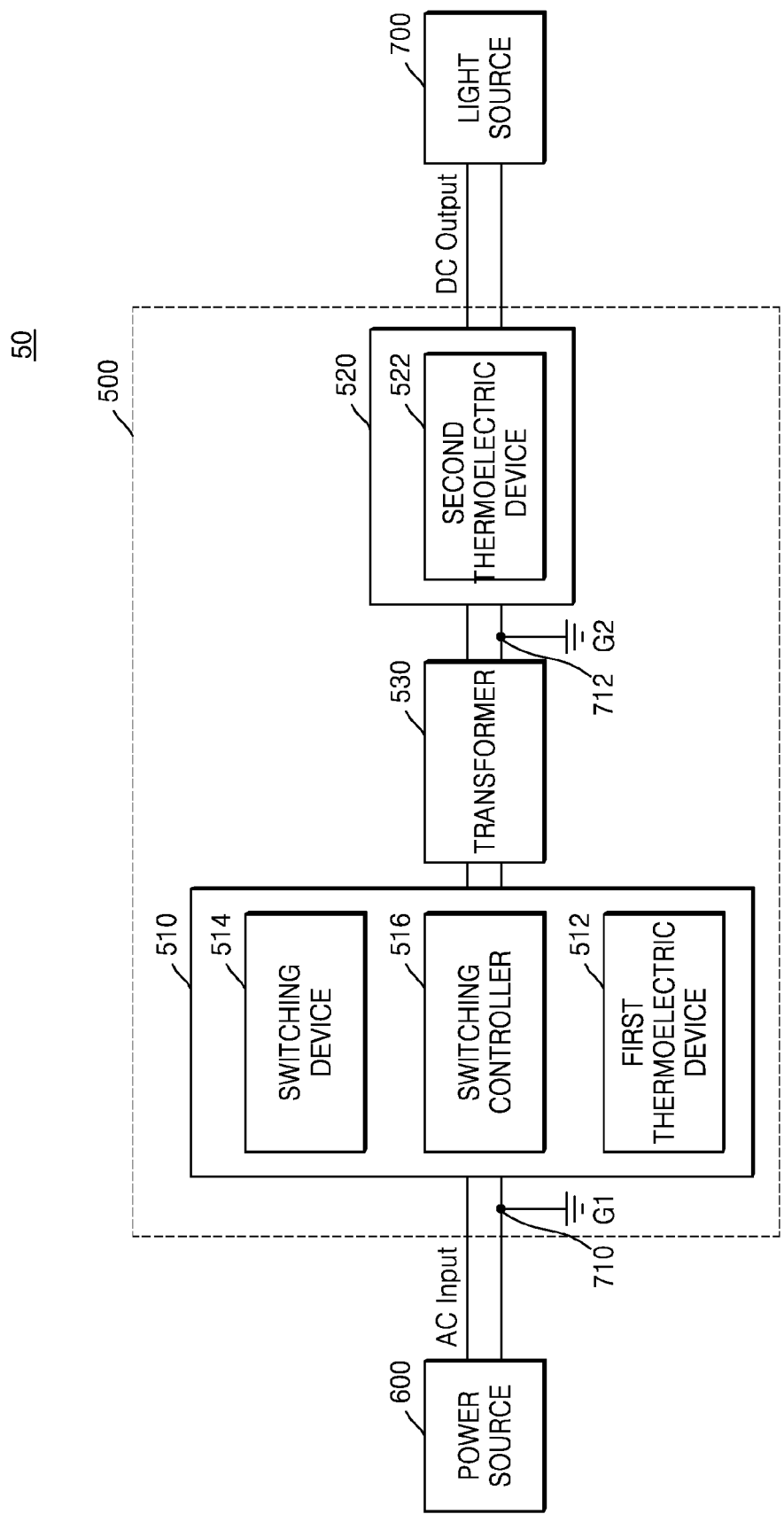
FIG. 7 shows a block diagram of a lighting device according to an exemplary embodiment.

FIG. 7 shows a block diagram of a lighting device 50 according to an exemplary embodiment.

Referring to FIG. 7, the lighting device 50 according to the present exemplary embodiment may include the power source 600, the LED driving apparatus 500, and the light source 700. The LED driving apparatus 500 may include the first circuit 510, the second circuit 520, and the voltage transformer 530. Herein, the present exemplary embodiment will be described based on only the difference distinguishable from the exemplary embodiments described in connection with FIGS. 5 and 6.

The first circuit 510 may include the switching device 514, one or more switching controllers 516, and the at least one first thermoelectric device 512. The switching device 514 may switch power supplied to the light source 700 including an LED, and the switching controller 516 may control the operation of the switching device 514. For example, a number of switching controllers 516 may correspond to a number of switching devices 514 and/or a number of thermoelectric devices 512. However, this is not limiting and the number of switching controllers 516 may be less than a number of switching devices 514 and/or a number of thermoelectric devices 512.

Figure 8:
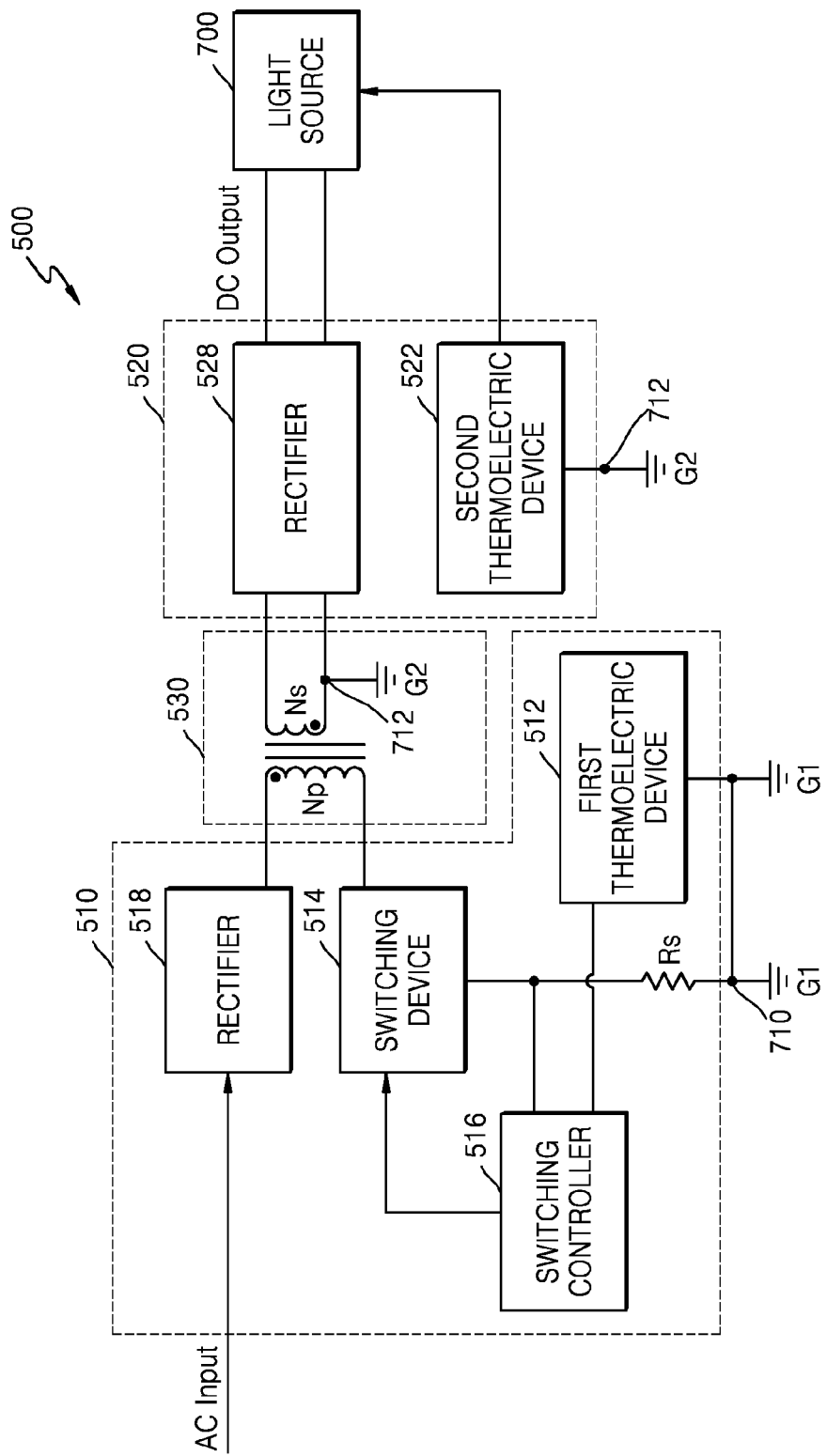
FIG. 8 shows a block diagram of a lighting device according to an exemplary embodiment, the lighting device including a fly-back converter.

FIG. 8 shows a block diagram of an LED driving apparatus 500 according to an exemplary embodiment, in which a fly-back converter is used as a DC/DC converter.

Referring to FIG. 8, the LED driving apparatus 500 may include the first circuit 510, the second circuit 520, and the voltage transformer 530. The LED driving apparatus 500 may include a driving circuit that generates an LED current to drive an LED, and the driving circuit may include a DC/DC converter circuit. In one or more exemplary embodiments, the DC/DC converter circuit may be a fly-back converter. However, exemplary embodiments are not limited thereto, and the use of the DC/DC converter is optional.

The first circuit 510 may include the rectifier 518, the switching device 514, the switching controller 516, and at least one first thermoelectric device 512. The first circuit 510 may be connected to the first ground G1. Accordingly, at least one first thermoelectric device 512 may be connected to the first ground G1. The switching device 514 may be connected to the first ground G1 through a resistance Rs.

The second circuit 520 may include the rectifier 528 and the at least one second thermoelectric device 522. The second circuit 520 may be connected to the second ground G2. Accordingly, the at least one second thermoelectric device 522 may be connected to the second ground G2.

The voltage transformer 530 may include a primary side coil Np and a secondary side coil Ns, and may control the voltage of the first circuit 510 and the second circuit 520. When the LED driving apparatus 500 further includes an auxiliary power source, the auxiliary power source may be connected to a third ground. There may be at least one third thermoelectric device connected to the third ground. That is, the number of grounds is not limited, and may vary depending on the circuit configuration.

Some or all of the first thermoelectric devices 512 may supply power to the switching controller 516. The number of switching devices 514, the number of switching controllers 516, and the number of first thermoelectric devices 512 may each be two or more. In this case, the plurality of first thermoelectric devices 512 may be respectively connected to the plurality of switching controllers 516.

Some or all of the second thermoelectric devices 522 may be connected to an LED included in the light source 700, and may provide power to turn on the LED. In this case, the entire area of the at least one second thermoelectric device 522 may be wider than that of the at least one first thermoelectric device 512. The at least one first thermoelectric device 512 and the at least one second thermoelectric device 522 may generate power at a higher intensity when the at least one first thermoelectric device 512 and the at least one second thermoelectric device 522 occupy a wider area between a high-temperature element and a low-temperature element. When the at least one first thermoelectric device 512 and the at least one second thermoelectric device 522 are connected in series, total power generated thereby may be increased. Accordingly, where more power is consumed, thermoelectric devices may be arranged to occupy more space. When the at least one second thermoelectric device 522 is connected to an LED including the light source 700, since power consumed by the LED is relatively high, the at least one second thermoelectric device 522 may occupy a relatively wide area.

The technical concepts of the LED driving apparatus 10 may be applicable to the lighting device 50, or vice versa.

Figure 9:
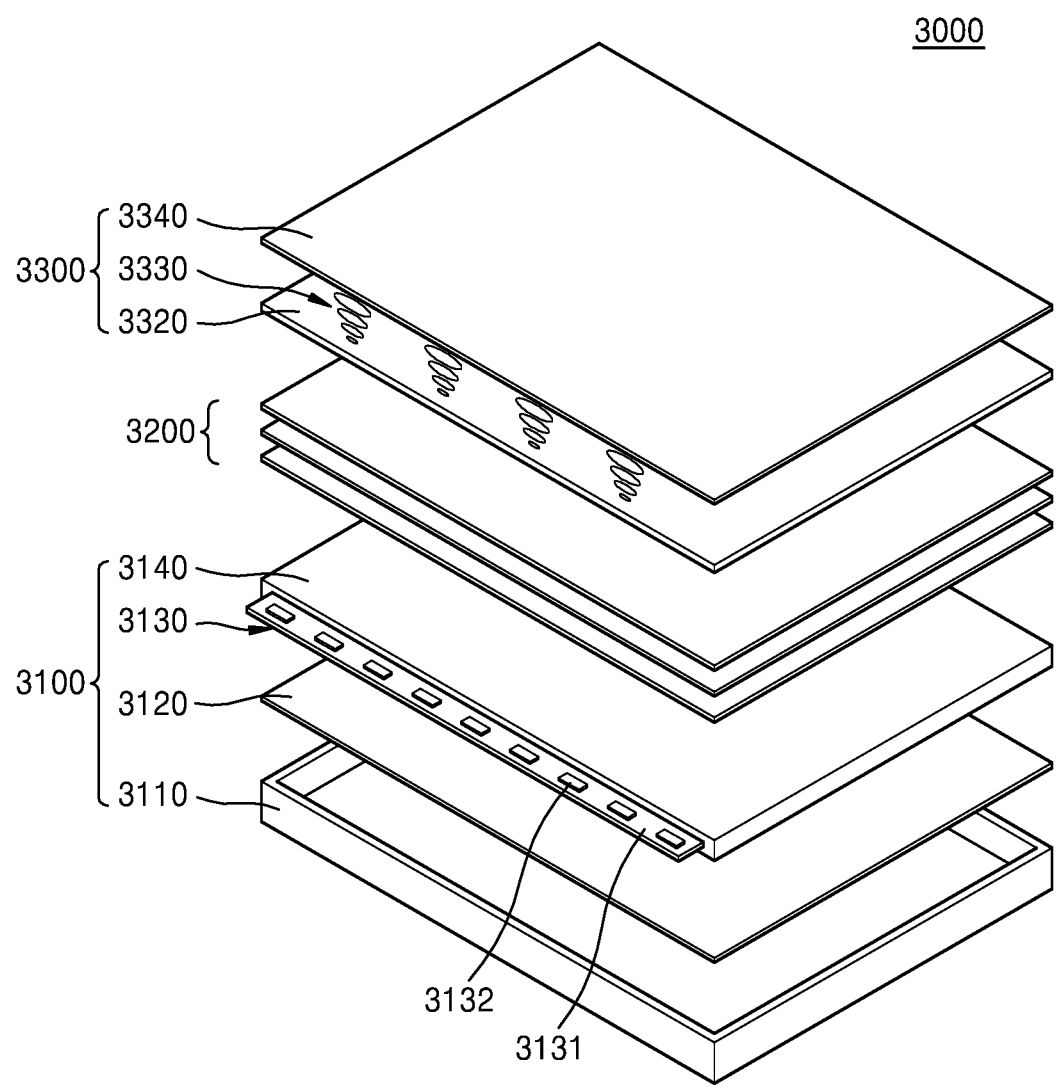
FIG. 9 is a schematic exploded perspective view of a display apparatus including an LED driving apparatus according to an exemplary embodiment and a lighting device according to an exemplary embodiment.

FIG. 9 is a schematic exploded perspective view of a display apparatus 3000 including an LED driving apparatus according to an exemplary embodiment and a lighting device according to an exemplary embodiment.

Referring to FIG. 9, the display apparatus 3000 may include a backlight unit 3100, an optical sheet 3200, and an image display panel 3300, such as a liquid crystal panel.

The backlight unit 3100 may include a bottom case 3110, a reflection plate 3120, a light guide plate 3140, and a light source module 3130 on at least one side surface of the light guide plate 3140. The light source module 3130 may include a PCB 3131 and a light source 3132. In one or more exemplary embodiments, the light source 3132 may be an edge-type LED mounted on a side surface adjacent to where light is emitted. The PCB 3131 may include at least one of the LED driving apparatuses 10 or at least one of the LED driving apparatuses 500 according to exemplary embodiments.

The optical sheet 3200 may be between the light guide plate 3140 and the image display panel 3300, and may include, for example, a dispersion sheet, a prism sheet, and/or a protective sheet.

The image display panel 3300 may display an image by using light passing through the optical sheet 3200. The image display panel 3300 may include an array substrate 3320, a liquid crystal layer 3330, and a color filter substrate 3340. The array substrate 3320 may include pixel electrodes arranged in a matrix form, thin film transistors applying a driving voltage to the pixel electrodes, and signal lines for operating the thin film transistors.

The color filter substrate 3340 may include a transparent substrate, a color filter, and a common electrode. The color filter may include a filter that optionally allows light having a particular wavelength among white light emitted by the backlight unit 3100 to pass therethrough. Due to an electric field formed between the pixel electrodes and the common electrodes, the liquid crystal layer 3330 is realigned to adjust a light-transmittance ratio. The resultant light passes through the color filter of the color filter substrate 3340, displaying an image. The image display panel 3300 may further include, for example, a driving circuit unit configured to process image signals.

Since the display apparatus 3000 uses the light source 3132 that emits blue light, green light, and red light, each having a relatively small half-width, when emitted light is passed through the color filter substrate 3340, blue, green, and red light having high purity may be embodied.

The technical concepts of the LED driving apparatus 10 and the lighting device 50 may be applicable to a flat panel illuminating apparatus, a bulb-type lamp, a bar-type lamp, etc.

While the inventive concepts have been described with reference to exemplary embodiments, it will be apparent to those skilled in the art that various changes and modifications may be made without departing from the spirit and scope of the following claims.

What is claimed is:

1. A light-emitting diode (LED) driving apparatus comprising:
    a printed circuit board (PCB) substrate having a voltage transformer and a switching device, which are provided above the PCB substrate, the PCB substrate comprising a first circuit corresponding to a primary side of the voltage transformer and a second circuit corresponding to a secondary side of the voltage transformer;
    a first molding layer provided on the PCB substrate and covering the voltage transformer and the switching device;
    at least one first thermoelectric device which dissipates heat and is connected to the first circuit; and
    at least one second thermoelectric device which dissipates heat and is connected to the second circuit.

2. The LED driving apparatus of claim 1, wherein the at least one first thermoelectric device and the at least one second thermoelectric device are provided on the first molding layer.

3. The LED driving apparatus of claim 2, further comprising:
    a second molding layer which is provided on the first molding layer and covers the at least one first thermoelectric device and the at least one second thermoelectric device.

4. The LED driving apparatus of claim 1, wherein the at least one second thermoelectric device is provided on the voltage transformer.

5. The LED driving apparatus of claim 1, wherein the at least one first thermoelectric device is provided on the switching device.

6. The LED driving apparatus of claim 5, further comprising:
    a heat dissipating plate provided between the switching device and the at least one first thermoelectric device.

7. The LED driving apparatus of claim 1, wherein the at least one first thermoelectric device has a first surface and the at least one second thermoelectric device has a second surface,
    the first surface and the second surface are parallel to an upper surface of the PCB substrate,
    the first surface is wider than the second surface if more power is consumed by the first circuit than by the second circuit, and
    the second surface is wider than the first surface if more power is consumed by the second circuit than by the first circuit.

8. The LED driving apparatus of claim 1, wherein the at least one first thermoelectric device in included in a plurality of first thermoelectric devices, and the at least one second thermoelectric device is included in a plurality of second thermoelectric devices,
    some of thermoelectric devices, among the plurality of first thermoelectric devices or among the plurality of second thermoelectric devices, are connected in series, and
    a number of series-connected thermoelectric devices, among the plurality of first thermoelectric devices or the plurality of second thermoelectric devices, is increased in proportion to power consumed by the first circuit or the second circuit, respectively.

9. A lighting device comprising:
    a first circuit comprising at least one first thermoelectric device and a switching device configured to switch electric power supplied to a light-emitting diode;
    a second circuit comprising at least one second thermoelectric device, and connected to the LED to drive the light-emitting diode; and
    a voltage transformer configured to control a voltage of the first circuit and the second circuit,
    wherein the at least one first thermoelectric device is connected to a first ground of the first circuit, and the at least one second thermoelectric device is connected to a second ground of the second circuit.

10. The lighting device of claim 9, wherein each of the first circuit and the second circuit further comprises a rectifier.

11. The lighting device of claim 9, wherein the first circuit further comprises a switching controller to control an operation of the switching device.

12. The lighting device of claim 11, wherein the at least one first thermoelectric device is one of a plurality of first thermoelectric devices, and some or all of the plurality of first thermoelectric devices convert heat into the electric power and provide the electric power to the switching controller.

13. The lighting device of claim 12, wherein the first circuit comprises a plurality of switching devices including the switching device, a plurality of switching controllers including the switching controller, and a plurality of first thermoelectric devices including the at least first thermoelectric device, and the plurality of first thermoelectric devices is respectively connected to the plurality of switching controllers to supply the electric power to the plurality of switching devices, respectively.

14. The lighting device of claim 9, wherein the second circuit comprises a plurality of second thermoelectric devices including the at least one second thermoelectric device, and some or all of the plurality of second thermoelectric devices convert heat into the electric power and are connected to the light-emitting diode to supply the electric power to turn on the light-emitting diode.

15. The lighting device of claim 14, wherein the at least one second thermoelectric device occupies a wider area than the at least one first thermoelectric device.

16. A light-emitting diode (LED) driving apparatus comprising:

a printed circuit board (PCB) substrate;

a voltage transformer which is provided on an upper surface of the PCB substrate, the voltage transformer having a primary side connected to an input power supply and a secondary side connected to a light emitting device (LED);

a first circuit provided on the upper surface of the PCB substrate, the first circuit comprising a switching device connected between the primary side of the voltage transformer and a first ground terminal;

a second circuit disposed on the upper surface of the PCB substrate and connected between the secondary side of the voltage transformer and the LED;

a first thermoelectric device connected between the switching device and the first ground terminal, the first thermoelectric device being configured to generate electric power and supply the generated electric power to the switching device; and a second thermoelectric device connected to a second ground terminal and the LED, the second thermoelectric device being configured to generate the electric power and supply the generated electric power to the LED, wherein at least a portion of the first thermoelectric device or a portion of the second thermoelectric device is disposed proximate the voltage transformer and overlaps the voltage transformer, to receive heat generated by the voltage transformer.

17. The LED driving apparatus of claim 16, wherein the first circuit comprises a first rectifier provided on the upper surface of the PCB substrate and connected between the input power supply and the primary side of the voltage transformer, and the second circuit comprises a second rectifier provided on the upper surface of the PCB substrate and connected between the secondary side of the voltage transformer and the LED.

18. The LED driving apparatus of claim 16, wherein the first circuit further comprises a switching controller connected between the first thermoelectric device and the switching device, the switching controller being configured to control an operation of the switching device.

19. The LED driving apparatus of claim 16, wherein the first ground terminal and the second ground terminal have a difference in potential, and the first thermoelectric device and the second thermoelectric device are configured to generate the electric power by converting heat transferred from heat-generating components of the first circuit and the second circuit, respectively.

20. The LED driving apparatus of claim 19, wherein the second thermoelectric device occupies a wider area than the first thermoelectric device for generating a higher amount of the electric power than the first thermoelectric device.

* * * * *